United States Patent [19]

Samour et al.

[11] 3,714,256

[45] Jan. 30, 1973

[54] DIALLYL AND DIMETHALLYL ALKYL LIPOPHILIC BENZYL AMMONIUM HALIDES

[75] Inventors: Carlos M. Samour, Wellesley; Mildred C. Richards, Wakefield, both of Mass.

[73] Assignee: The Kendall Company, Walpole, Mass.

[22] Filed: May 26, 1970

[21] Appl. No.: 40,719

[52] U.S. Cl. ......260/567.6 M, 260/29.6, 260/86.1 N, 260/404, 260/482 R, 260/458, 260/501.15, 260/924
[51] Int. Cl................................................C07c 87/02
[58] Field of Search....260/567.6 M, 567.6 R, 89.7 N

[56] References Cited

UNITED STATES PATENTS

| | | | |
|---|---|---|---|
| 3,515,707 | 6/1970 | Reimschuessel et al. | 260/567.6 M |
| 3,412,019 | 11/1968 | Hoover et al. | 260/89.7 N |
| 3,288,770 | 11/1966 | Butler | 260/89.7 N |

*Primary Examiner*—Howard T. Mars
*Assistant Examiner*—Michael W. Glynn
*Attorney*—Ellen P. Trevors and Robert D. Chodera

[57] ABSTRACT

Quaternary ammonium salts having a diallyl or dimethallyl radical and a lipophilic radical covalently linked to the quaternized nitrogen are disclosed. These quaternary ammonium salts are useful as monomeric emulsion stabilizers.

3 Claims, No Drawings

DIALLYL AND DIMETHALLYL ALKYL LIPOPHILIC BENZYL AMMONIUM HALIDES

This invention relates to stabilizing agents for emulsion polymerization. More particularly it relates to a class of quaternized organic salts which serve simultaneously as stabilizing agents for emulsion polymerization and as monomeric reactants in the polymerization, so that the salts become an integral part of the polymer, which is thereby self-stabilized without the use of surfactants.

Polymeric latices, derived from ethylenically-unsaturated monomers, are widely used for a variety of applications, such as adhesive masses and binders for nonwoven fabrics. Most conventional polymeric latices are produced by an emulsion polymerization process, in which monomeric materials are polymerized while they are dispersed in an aqueous medium by means of a surface active agent. The surface active agent may be anionic in nature, such as soap or sodium lauryl sulfate. Alternatively, it may be of a nonionic type as represented by various ethylene oxide derivatives, or by polyhydroxy compounds, or it may be cationic, as represented by alkyl ammonium halides. Cationic agents are preferably combined with a nonionic agent for improved performance. The polymerization of monomeric materials is also frequently effected in the presence of water soluble protective colloids or stabilizing agents. Any of the above emulsifying or stabilizing agents leads to the presence of a water-sensitive ingredient in the final polymeric latex. For latex utilizations wherein wet strength and resistance to the influence of water are desirable, as in most paper coatings, nonwoven fabrics, certain pressure-sensitive adhesive tapes, and the like, the presence of a water-sensitive ingredient in the polymeric mass is undesirable.

A preferred method of avoiding the presence of water-sensitive elements in a polymeric latex is to employ what is termed herein monomeric emulsion stabilizers — that is, a class of organic monomer which copolymerizes with the ethylenically unsaturated monomers, becoming part of the final polymer, but which stabilizes the polymerization process against the formation of coagulum and against subsequent phase separation. In accordance with this invention, it has been found that selected quaternary ammonium salts wherein a diallyl or dimethallyl radical and a lipophilic radical are covalently linked to the quaternized nitrogen are excellent monomeric emulsion stabilizers for the polymerization of ethylenically unsaturated monomers.

More particularly, the compounds of this invention have the formula

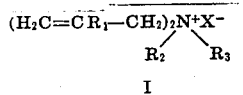

I wherein $R_1$ is hydrogen or methyl; $R_2$ is alkyl, hydroxyalkyl, aryl, $R_4$—O—CO—$CH_2$— or $R_4$—NH—CO—$CH_2$— wherein $R_4$ is hydrogen or alkyl; $R_3$ is a lipophilic radical comprising an aliphatic hydrocarbon chain covalently linked to the nitrogen atom through an intermediate radical, and $X^-$ is an anion, e.g., halide, alkyl sulfate, alkyl benzene sulfonate, phenoxy (or alkyl phenoxy), alkylene (or polyalkyleneoxy) sulfate, dialkyl sulfosuccinate or alkyl phosphate.

These compounds I are readily prepared from available materials, and thus are attractive for use in commercial operations.

While any compound having the general formula I can be provided according to this invention, preferred monomeric emulsion stabilizers include those compounds I wherein $R_1$ is hydrogen or methyl;
$R_2$ is alkyl or hydroxyalkyl having one to seven carbon atoms, benzyl, $R_4$—O—CO—$CH_2$— or $R_4$—NH—CO—$CH_2$— wherein $R_4$ is hydrogen or alkyl having one to four carbon atoms;
$R_3$ is a lipophilic radical comprising an aliphatic hydrocarbon chain having from about seven to about 28 carbon atoms, and preferably from about nine to about 18 carbon atoms, including saturated, unsaturated, straight-chain and branched groups, and mixtures thereof. This aliphatic hydrocarbon chain is covalently linked to the nitrogen through an intermediate linkage as illustrated below where L represents the aliphatic hydrocarbon chain:
a benzyl group,

an ester or amide group such as —$CH_2$—$CHR_5$—ACO—L wherein $R_5$ is hydrogen or methyl and A is oxygen or —NH—;
a polyalkylene oxide group such as —O—$CH_2$—$CHR_6$—(O—$CH_2$—$CHR_6$)$_n$—OL wherein $R_6$ is hydrogen or methyl and $n$ is zero to 4;
an acetoxy or acetamido group such as —$CH_2$—CO—OL and —$CH_2$—CO—NHL;
alkylene ethers such as —$CH_2$—O—L and —$CH_2$—$CH_2$—O—L;
a hydroxysuccinyloxy or hydroxysuccinylamino group having the formula —$R_7$—A—CO—CHL—$CH_2$—COOH wherein $R_7$ is a diradical, preferably ethylene, propylene, isopropylene, 2-hydroxypropylene, acetoxypropylene, or —O—$CH_2$—$CHR_8$(O—$CH_2$—$CHR_8$)$_n$— where $R_8$ is hydrogen or methyl and $n$ is zero to 4, and A is oxygen or —NH—; and isomers of the aforementioned hydroxysuccinyloxy or hydroxysuccinylamino groups wherein the aliphatic hydrocarbon chain L is attached to the carbon atom adjacent to the carboxyl group.

The monomeric emulsion stabilizers having the formula I can be synthesized by several convenient methods. For example, compounds I where $X^-$ is halide can be provided by reacting a tertiary amine having the formula ($H_2C=CR_1$—$CH_2$)$_2$$NR_2$ II with a lipophic halide having the formula $R_3X$ wherein $R_1$, $R_2$, $R_3$ and $X$ are as previously described.

Illustrative tertiary amines having the formula II include diallylmethyl amine, dimethallylmethyl amine, diallylisopropyl amine, diallyl n-heptyl amine, diallyl aminoethanol, diallyl amino-3-heptanol, diallylbenzyl amine, methyl diallylaminoacetate, diallylaminoacetate, diallylaminoacetamide, N-ethyl N'-diallylaminoacetamide and butyl diallylaminoacetate.

Exemplificative lipophilic halides suitable for reaction with tertiary amines III include heptylbenzyl chloride, octacosyl benzyl chloride, chloroethyl acid heptylsuccinate, 3-chloro-2-hydroxypropyl acid dodecylsuccinate, bromoethyl tridecylsuccinamic acid, bromoethyl dodecyl ether, lauroyloxyethyl chloride, dodecyloxypolyethyleneoxyethyl bromide, decyl chloroacetate, etc.

An alternate route to all compounds I, excluding those where the lipophilic radical comprises an intermediate hydroxysuccinyloxy or hydroxysuccinylamino linkage, comprises quaternizing a lipophilic tertiary amine having the formula $(H_2C=CR_1-CH_2)_2NR_3$ III. Illustrative lipophilic amines III, which are readily provided by alkylating diallyamine with an appropriate alkyl halide in the presence of base, include N-(decanoyloxyethyl)diallylamine, dodecyl N-diallylaminoacetate, N-hexadecyl N'-diallylaminoacetamide, lauroyl-(polyethyleneoxy) ethyl N-diallyamine, decyloxyethyl N-diallylamine, dodecylbenzyl diallylamine, etc. Suitable quaternizing agents useful in this method for the preparation of compounds I include ethyl chloroacetate, propyl chloroacetate, chloroacetamide, methyl chlorosulfate, dodecyl bromide, tridecyl chloroacetate, benzyl chloride, methyl toluene sulfonate, methyl lauryl sulfate, etc.

Monomeric emulsion stabilizers having the formula I where $X^-$ is halide and $R_3$ is a lipophilic radical comprising an aliphatic hydrocarbon chain covalently linked to the quaternary nitrogen through a hydroxysuccinyloxy or hydroxysuccinylamino linkage can be readily prepared by reacting a succinic anhydride having an aliphatic hydrocarbon group with a halo alcohol or amine to provide an intermediate which is then reacted with the previously described tertiary amine II in accordance with the following equation wherein L, X, $R_7$ and A are are previously described.

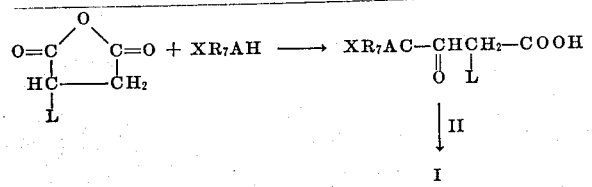

The succinic anhydrides having an aliphatic hydrocarbon group are readily provided by known methods, such as by reacting maleic anhydride with an olefin as described in U.S. Pat. No. 2,741,597. Illustrative compounds include heptenylsuccinic anhydride, octacosasuccinic anhydride, n-heptylsuccinic anhydride, iso-octadecenylsuccinic anhydride, etc.

Suitable halo alcohols and amines include chloroethanol, chloropropanol, chloroethylamine, chloro-2-hydroxypropylamine, bromoethanol, iodoethanol, 1-chloropropanediol-2,3, etc.

Monomeric emulsion stabilizers I can also be prepared by reacting diallyl amine with the intermediate described in the preceding equation followed by quaternization with one of the previously mentioned agents, but this is not a preferred method.

All compounds I wherein $X^-$ is other than halide can be provided by reacting the corresponding quaternary ammonium halide with an alkali metal or ammonium salt such as an alkali metal alkyl sulfate, an alkali metal alkyl benzene sulfonate, an ammonium phenoxy (or alkyl phenoxy) alkylene (or polyalkyleneoxy alkylene) sulfate, an alkali metal dialkyl sulfosuccinate or an alkali metal alkyl phosphate. Exemplificative salts include sodium lauryl sulfate, sodium oleoyl sulfate, sodium dodecyl benzene sulfonate, di-tridecyl sodium sulfosuccinate, di-octyl sodium sulfosuccinate, sodium octadecyl phosphate, sodium di-2-ethylhexyl phosphate, etc.

The aforementioned reactions to provide the monomeric emulsion stabilizers I are generally carried out at temperatures from about 0°C to 100°C, but higher or lower temperatures can be employed.

Although some of the reactions proceed readily in the absence of a solvent, e.g., where the reactants and products are liquids, diluents such as water, acetonitrile, dimethylformamide, ethyl acetate, methanol and methylene chloride are preferably employed. It will be apparent that aqueous reaction solutions are not appropriate where one of the reactants is the alkyl or alkenyl succinic anhydride. Monomers such as acrylonitrile and ethyl acrylate can also be utilized as solvents in the preparation of the monomeric emulsion stabilizers. While compounds I can be isolated prior to use in polymerization reactions, preferably they are used in their reaction solutions.

Particularly preferred monomeric emulsion stabilizers include those compounds I wherein $R_1$ is hydrogen; $R_2$ is alkyl having one to four carbon atoms; $R_3$ is

or $-CH_2-CO-OL$ wherein L is an aliphatic hydrocarbon chain having about nine to about 18 carbon atoms; and $X^-$ is chloride or bromide.

In the process of this invention, where a minor amount of monomeric emulsion stabilizer I is copolymerized with a major amount of a different ethylenically-unsaturated monomer, compounds having the general formula I wherein the aliphatic hydrocarbon chain L is attached directly to the quaternary nitrogen can also be employed. Thus, the term "lipophilic radical," in the claims, can include a radical covalently linked to the nitrogen either directly or through one of the previously described intermediate linkages. It will be apparent that the resulting copolymers contain a minor amount of groups derived from such monomeric emulsion stabilizers, in contradistinction to those copolymers disclosed in U.S. Pat. No. 3,490,938 wherein it is taught that the diallyl quaternary moiety of selected copolymers, useful in the formation of electroconductive coatings, should constitute at least 90 percent of the copolymer by weight for best results. The copolymers of this invention also differ from the water-soluble homopolymers having a linear chain of repeating rings disclosed in the aforementioned U.S. Pat. No. 3,490,938 and in U.S. Pat. No. 3,288,770.

Illustrative ethylenically-unsaturated monomers suitable for copolymerizing with the monomeric emulsion stabilizers of this invention comprise vinyl acetate, vinyl chloride, acrylonitrile, and acrylic monomers in general represented by the formula

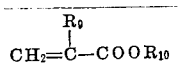

where $R_9$ is a hydrogen atom or a methyl group, and $R_{10}$ is an alkyl radical of one to 14, and preferably one to four carbon atoms. As is known in the art of preparing acrylic ester polymers, the softness of the polymer and the difficulty of initiating polymerization increase as the number of carbon atoms in the ester group increases. In the practice of this invention, when the acrylic monomer contains more than eight carbon atoms in the ester group, it is advantageous for ease of initiation and polymerization to mix therewith at least about 20 mole percent of an acrylic ester with fewer than four carbon atoms in the ester group.

Mixtures of more than one such ethylenically unsaturated monomer may be used, and in order to impart special properties of toughness, rigidity, or cross-linking reactivity to the polymer, a minor proportion, usually less than 20 mole percent of the major monomer, may be replaced by some other ethylenically unsaturated monomer such as vinyl esters other than vinyl acetate as typified by vinyl laurate and vinyl stearate; vinyl ethers such as vinyl methyl ether, vinyl ethyl ether, and vinyl butyl ether; di-unsaturated monomers such as diethylene glycol diacrylate, ethylene glycol diitaconate, diallyl phthalate, divinyl benzene and the like; acrylic and methacrylic acids, acrylamide and methacrylamide, hydroxyethyl acrylate and methacrylate, hydroxypropyl acrylate and methacrylate, and styrene.

In general, in the polymerization process of this invention, 0.1 to 10 percent by weight of monomeric emulsion stabilizer is employed, with 1 to 5 percent by weight being preferred. The amount of monomeric emulsion stabilizer is based on the total monomers added to the polymerization reaction.

Aqueous polymeric dispersions may be prepared according to this invention in which the solid polymer content is 40 percent to 50 percent by weight. If desired, the solids content may be diluted to 1 percent by weight or less, with excellent retention of stability at both the higher and lower concentrations.

The monomeric emulsion stabilizers of this invention are useful in both batch and continuous polymerization processes.

The following examples will serve to illustrate the practice of this invention.

EXAMPLE 1

The amount of 2.8g. of methyldiallylamine was mixed with 7.4g. dodecyl benzyl chloride in 10g. acetonitrile. After standing for 4 days at room temperature, a clear, homogeneous solution was obtained. Removal of solvent provided a viscous yellow-orange liquid identified by chloride ion analysis as methyldiallyl dodecyl benzyl ammonium chloride.

The amount of 3g. of the above compound was charged to a four-neck resin kettle equipped with a thermometer, stirrer, nitrogen inlet and dropping apparatus and ethyl acrylate (64g.), butyl acrylate (20g.) and water(240g.) added. The pH of the resulting emulsion was 5.5–6.0. After cooling to 15°C by the use of an ice bath, 10ml of 3 percent $H_2O_2$ in $H_2O$ were added to the emulsion followed by the dropwise addition of a reductant solution comprising 0.02g. ferrous ammonium sulfate and 0.4g. ascorbic acid in 10ml $H_2O$. Polymerization was initiated after 5.1ml of reductant solution had been added as evidenced by an exotherm of 17° in 13 minutes. A total of 8ml of reductant solution and an additional 2ml $H_2O_2$ solution was employed in the polymerization. The yield of polymer was 98 percent of theoretical and no coagulum formed.

EXAMPLE 2

Following the procedure of Example 1, 15.3g. of butyl diallyl amine was mixed with 29.5g. dodecyl benzyl chloride in 40g. acetonitrile. After allowing the reaction mixture to stand for 4 months at room temperature, the solvent was removed to provide a viscous yellow liquid identified by chloride ion determination as butyldiallyl dodecylbenzyl ammonium chloride.

The amount of 2.9g. of the above compound was dissolved in 240g. of $H_2O$ and 80g. of ethyl acrylate was added. The pH of the resulting emulsion was about 5.0. After cooling to about 18°C by the use of an ice bath, 10ml of 3 percent $H_2O_2$ in $H_2O$ were added to the emulsion followed by the dropwise addition of the reductant solution described in Example I. Polymerization was initiated after 0.9ml of reductant solution had been added as evidenced by an exotherm of 30° in 3 ½ minutes. A total of 3.5ml of reductant solution and an additional 2ml $H_2O_2$ solution was employed in the polymerization. The yield of polymer was 93 percent of theoretical and no coagulum formed.

EXAMPLE 3

Methyldiallylamine (2.8g.) and tridecylchloroacetate (6.9g.) were mixed in 11.4g. acetonitrile. After standing for 4 days at room temperature, a clear, homogeneous solution was obtained. Solvent was removed under vacuum to provide a viscous yellow liquid identified by theoretical ion content as methyl diallyl tridecyloxycarbonylmethyl ammonium chloride.

The amount of 3g. of the above compound was dissolved in 240g. $H_2O$ and 80g. ethyl acrylate was added. The pH of the resulting emulsion was about 5.0. After cooling to about 18°C by the use of an ice bath, 10ml of 3 percent $H_2O_2$ in $H_2O$ were added to the emulsion followed by the dropwise addition addition of the reductant solution described in Example 1. Polymerization was initiated after 0.8ml of reductant solution had been added. A total of 2.3ml of reductant solution was used. The yield of polymer was 88 percent of theoretical and no coagulum formed.

EXAMPLE 4

Methyldiallyldodecyl ammonium bromide was prepared by reacting 2.1g. of methyldiallylamine with 4.7g. 1-bromododecane in 8g. acetonitrile at room temperature and allowing the reaction mixture to stand for 6 days. Solvent was removed under vacuum.

The amount of 3g. of the above compound was dissolved in 240g. $H_2O$ and 80g. ethyl acrylate was added;

the pH of the resulting emulsion was about 5.0. After cooling to about 18°C, by the use of an ice bath, 10ml of 3 percent $H_2O_2$ in $H_2O$ were added to the emulsion followed by the dropwise addition of the reductant solution described in Example 1. Polymerization was initiated after 3.4ml of reductant solution had been added as evidenced by an exotherm of 28° in 5 minutes. A total of 5.5ml of reductant solution was used. The yield of polymer was 89 percent of theoretical.

What is claimed is:

1. A compound having the formula

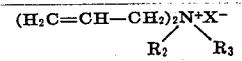

wherein $R_2$ is alkyl having one to four carbon atoms; $R_3$ is

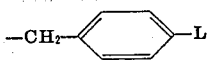

wherein L is an aliphatic hydrocarbon chain having about nine to 18 carbons; and $X^-$ is chloride or bromide.

2. The compound of claim 1 having the name methyldiallyl dodecylbenzyl ammonium chloride.

3. The compound of claim 1 having the name butyldiallyl dodecylbenzyl ammonium chloride.

* * * * *